United States Patent Office 3,359,702
Patented Dec. 26, 1967

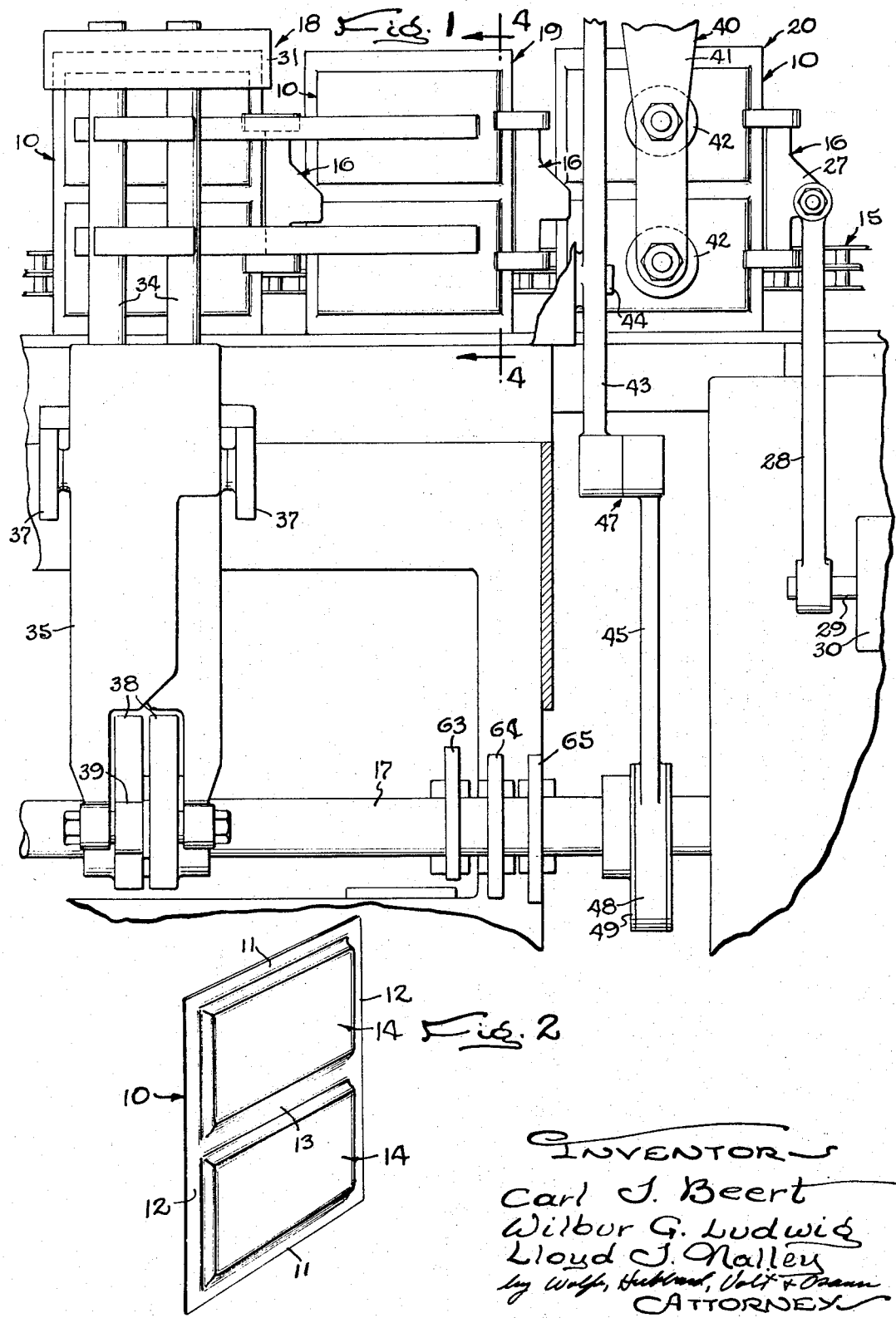

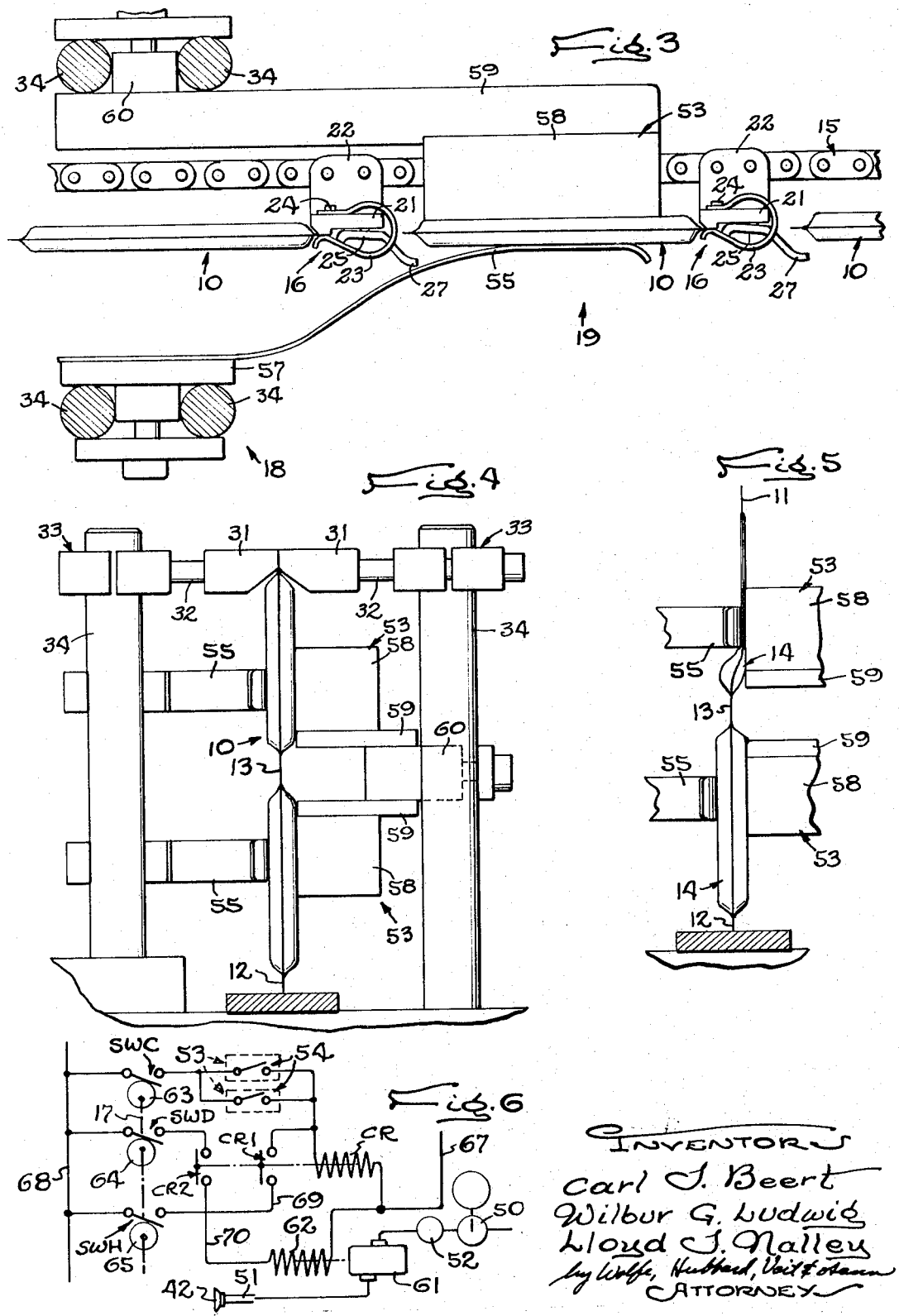

3,359,702
APPARATUS FOR DETECTING AND REJECTING IMPROPERLY FILLED PACKAGES
Carl J. Beert, Wilbur G. Ludwig, and Lloyd J. Nalley, Rockford, Ill., assignors to Bartelt Engineering Company, Inc., Rockford, Ill., a corporation of Delaware
Filed Oct. 6, 1965, Ser. No. 493,351
8 Claims. (Cl. 53—53)

This invention relates generally to packaging machinery and, more specifically, to the detection and rejection of improperly filled packages. The invention has particular utility in an automatic machine for forming, filling and closing flexible walled bags and transferring successive completed bags to the in-feed conveyor of a cartoning machine for collection in stacks and eventual insertion in cartons.

The general object of the invention is to detect all improperly filled bags and separate the same from the remainder of the bags in a simple and effective manner as an incident to the transfer of the bags from the delivery conveyor to the discharge point.

A related general object is to eliminate all improperly filled bags from the succession before the bags reach the cartoning mechanism.

A more detailed object is to detect the presence of improperly filled bags as the latter approach the transfer station and use the signals produced by the detecting device to override the normal operation of the transfer device and effect the release of each improperly filled bag at an intermediate point between the transfer station and the normal discharge point.

Another object is to delay the actuation of the rejecting apparatus until the bag producing the signal has been picked up and partially transferred to the discharge point.

A further object is to simplify the construction of the machine by combining the detection device with the mechanism for closing the bags prior to detection and transfer.

Still another object is to produce the delay in utilization of the signals of the detecting device in a simple and effective manner.

Other objects and advantages of the invention will become apparent from the following detailed description taken in connection with the accompanying drawings, in which FIGURE 1 is a fragmentary side elevation showing a portion of a packaging machine embodying the novel features of the present invention.

FIG. 2 is a perspective view of a representative bag.

FIG. 3 is a fragmentary plan view of part of FIG. 1.

FIG. 4 is an enlarged fragmentary cross-section taken substantially along the line 4—4 of FIG. 1.

FIG. 5 is a view similar to part of FIG. 4 with parts in moved positions.

FIG. 6 is a schematic diagram illustrating the primary components of the machine control.

As shown in the drawings for purposes of illustration, the invention is incorporated in a machine for forming, filling and closing packages 10 and transferring successive completed packages to a discharge point (not shown) such as the in-feed conveyor of a cartoner for collection of the packages in stacks and eventual insertion in cartons. The invention is concerned with the portion of the machine which completes the packages and effects the transfer and only this portion is shown herein.

As shown in FIGS. 1 and 2, the representative packages 10 are in the form of rectangular bags comprising two sheets of flexible material disposed side by side and secured together along all four edges by heat seals 11 and 12 to form a closed package. In this instance, the sheets also are joined together by an intermediate seal 13 dividing the bag into two compartments 14 each filled with a quantity of product which bulges the flexible sheets away from each other generally as shown in FIGS. 2 and 3.

A succession of such bags 10 comes off the packaging machine in spaced edge-to-edge relation on a conveyor 15 having a series of spaced clamps 16 gripping the leading edge portions of the bags and holding the latter for edgewise movement in a common vertical plane. Herein, the conveyor comprises two endless chains disposed in side-by-side horizontal planes and trained around sprocket wheels (not shown) journaled on the machine frame for rotation about vertical axes. One set of sprocket wheels is power rotated by a suitable connection with the continuously rotating main shaft 17 of the packages to advance the chains from left to right as viewed in FIGS. 1 and 3, preferably with an intermittent motion carrying each bag successively and step by step through three dwell positions or stations 18, 19 and 20 shown in FIG. 1. Herein the bags move one step for each revolution of the shaft.

The clamps 16 are of a well known type having bodies 21 (FIG. 3) fast on spaced lugs 22 projecting outwardly from the chains 15 with C-shaped spring clips 23 cooperating with the bodies to grip the leading edge portions of the bags. One end of each clip is secured at 24 to the back of the body and the free end portion curves around the body and is pressed tightly against the front thereof. Operators 25 disposed between the clips and the bodies open the clamps to release the bags in response to an inward opening force applied to outwardly extending fingers 27 on the operators. This force is applied at the transfer station 20 by a lever 28 (FIG. 1) mounted at its lower end on a shaft 29 oscillated back and forth in timed relation with the advance of the bags by a drive connection shown in part at 30 with the drive shaft 17.

When each bag 10 is in the sealing station 18, its upper end is open and disposed between two heated sealing elements 31 which are spaced apart on opposite sides of the path of the bags and are movable toward each other to clamp and heat seal the bags at 11 as shown in FIG. 4. While such clamping may be accomplished in some instances with one fixed element and one movable element, herein both elements are supported for swinging toward and away from the bag in the sealing station. As shown in FIG. 4, each sealing element is a bar carried on pins 32 projecting inwardly from a clamp 33 on the upper end portions of two parallel supporting rods 34 extending upwardly from a rocker 35 pivoted intermediate its ends between two brackets 37 on the frame. The lower portions of the two rockers are disposed on opposite sides of the shaft 17 adjacent a pair of cams 38 on the shaft with a follower roller 39 on each rocker riding on the periphery of one of the cams. Springs (not shown) hold the rollers against the cams which are shaped to swing the lower ends of the rockers alternately away from each other and then back toward each other. This swings the seal bars toward each other and into sealing engagement with each bag in the sealing station and then away from the bag before the latter is advanced on through the next two stations 19 and 20.

At the transfer station 20, the bags 10 are removed from the conveyor 15 by a transfer device 40 which may be of the well known type shown and described in Patent No. 2,826,881. Such a device grips each bag as it is released by the associated clamp 16, swings the bag laterally away from the conveyor while turning it ninety degrees to a horizontal position, and releases the bag at the discharge piont. The portion of the device shown herein is a transfer arm 41 having two suction cups 42 on its lower end spaced to engage the two compartments 14. A crank mechanism for moving the transfer arm is formed by an arm 43 pivoted intermediate its ends at 44 on the frame to rock about a horizontal axis and a second arm 45 pivoted at one end at 47 on the lower end of the arm 43 and fast at the other end on a ring 48 encircling an eccentric cam 49 on the shaft 17. As described in detail in the aforesaid patent, such a mechanism swings the suction cups 42 back and forth between the pick-off position shown in FIG. 1 in which the cups engage the bag in the transfer station and a discharge position spaced laterally from the pick-off position. The device completes one cycle for each revolution of the drive shaft.

Vacuum developed by a pump 50 (FIG. 6) is applied to the cups through a flexible line 51 when the cups are in the pick-off position and normally is released when the cups are in the discharge position. A suitable valve 52 operated by a cam (not shown) on the shaft 17 controls the normal application and release of the vacuum in the vacuum cups in a well known manner and in timed relation with the swinging of the cups and the advance of the bags on the conveyor.

The present invention contemplates a novel apparatus for detecting whether the bags 10 advancing along the conveyor 15 are properly filled and separating all improperly filled bags from the remainder of the bags in a simple and effective manner as an incident to the transfer of the bags from the conveyor to the discharge point. For this purpose, a detecting device 53 is mounted along the path of the bags to feel the sides of each bag and produce a signal in response to engagement with each improperly filled bag, and means is provided for effecting the release of each such bag by the transfer device 40 at a point between the pick-off position and the discharge position. Thus, the detecting and rejecting apparatus is made a part of the packager rather than the cartoner, and eliminates improperly filled bags before they reach the cartoner.

In this instance, the detecting device 53 comprises two detecting elements 54 and 55 disposed on opposite sides of the bag path and movable toward and away from each other into engagement with the opposite sides of each bag in the detection station 19 to become spaced apart a distance corresponding to the thickness of the bag between them. For packages having two compartments 14, two sets of elements are used to check both compartments of each bag. One element 54 of each set is a backing housing a proximity switch and the other element 55 is a feeler in the form of an elongated spring arm adapted to be yieldably pressed against the filled portion of the bag.

To support and operate the detecting devices 53 in the most convenient and economical manner, the elements 54 and 55 are mounted on the rods 34 supporting the sealing bars 31 and thus are movable with the latter toward and away from the bag path. As shown in FIG. 3, each spring arm is fastened at its left end to a plate 57 on the adjacent pair of supporting rods and extends horizontally downstream to the right alongside the bag 10 in the detection station 19, that is, the bag preceding the bag then disposed in the sealing station 18. Between the two stations, the spring arm curves toward the bag path far enough to engage and be pressed against both full and empty compartments 14 when the sealing bars are together as in FIG. 4. The proximity switch 54 of each set is housed in a box-like case 58 supported alongside the detection station on a plate 59 (FIG. 4) fastened to one side of a bar 60 fastened to the rods 34 below the seal bar, the two switch cases being spaced apart vertically to engage the sides of both compartments 14 of a bag in the manner shown in FIG. 4 when the sealing bars are together.

With this arrangement, the two elements 54 and 55 of each set are pressed against the opposite sides of the bag 10 in the detection station 19 as the top seal 11 is applied to the bag in the sealing station 18. If both compartments of the bag being checked are properly filled, the spring arms 55 are held away from the associated proximity switches far enough to prevent actuation of the switches. If, on the other hand, one or the other of the compartments is underfilled, the associated feeler presses close enough to its switch (as shown at the top in FIG. 5) to actuate the switch and thereby signal the presence of the underfilled bag. Such switches are well known in the art and are shown only schematically herein in FIG. 6.

While the signals produced by the proximity switches 54 can be used to operate the regular vacuum valve 52 controlling the normal operation of the transfer device 40 it has been found to be more convenient to install a second valve 61 (FIG. 6) between the pump 50 and the cups 42 for breaking the suction and releasing the underfilled bags during the subsequent transfer operation. Herein, the second or reject valve is normally open and is operated by a solenoid 62 that is energized with a delayed action to close the reject valve in response to closing of either of the proximity switches. To obtain the desired rejection action at the proper time, that is, as the underfilled bag subsequently is transferred from the conveyor 15 to the normal discharge point, the signals from the proximity switches are used to prepare a reject circuit which is not completed until a cam-operated switch SWD closes during the transfer of the underfilled bag.

Mounted on and continuously rotating with the shaft 17 are three cams 63, 64 and 65 (FIGS. 1 and 6) operating three switches SWC, SWH and SWD (FIG. 6) at prearranged times during each revolution of the shaft to time the proximity switches and the reject solenoid 62 into the sequence of the machine. As will be seen in the schematic diagram in FIG. 6, the switch SWC is in series with the proximity switches 54 in the circuit of a solenoid CR across power lines 67 and 68 so that this solenoid is energized whenever switch SWC and one of the proximity switches are closed. Switch SWC is held closed by the cam 63 during each dwell period between each two steps of the conveyor 15, and one of the proximity switches closes only when in underfilled bag is in the detection station 19. Thus, the presence of the underfilled bag in the detection station results in energization of the solenoid CR and closing of its switches CR1 and CR2.

Switch CR1 completes a holding circuit for the solenoid CR through a line 69 and switch SWH therein which is held closed during the conveyor dwell by the cam 64. Switch CR2 prepares a circuit for the energization of the reject solenoid 62 through a line 70 and switch SWD. The latter, however, is open during the dwell of the conveyor. Thus, the transfer device 40 completes the normal transfer of the bag in the transfer station before the underfilled bag reaches the transfer station. As the shaft 17 continues to rotate and the underfilled bag is advanced into the transfer station, switch SWC opens while switch SWH remains closed to maintain the circuit through relay CR. Then, as the underfilled bag is being transferred toward the discharge point, switch SWD closes momentarily to energize the reject solenoid. This closes the reject valve 61 to effect the release and rejection of the underfilled bag.

It is important to note that switch SWD closes before switch SWC during each cycle of the machine, thereby completing the reject circuit before the detecting device 53 is activated with respect to the bag then in the detection station 19. Thus, switches SWC and SWD and their cam operators 63 and 64 delay the utilization of the signal from the detecting device until after the underfilled bag has been shifted from the detection station to the transfer station, picked off by the transfer device and carried part of the way to the discharge position. Moreover, switch SWC delays the production of the next signal until after switch SWD has closed to reject the previous bag if the latter was underfilled. Switch SWD reopens prior to the pick-off portion of the next cycle to restore control of the transfer device to the valve 52.

We claim as our invention:

1. In a packaging machine, the combination of, a conveyor for supporting a succession of flexible bags in edge-to-edge relation and advancing the same edgewise and step by step along a predetermined path through detection and transfer stations, a transfer device at said transfer station including a suction cup movable back and forth between a pick-off position in engagement with the bag in said transfer station and a discharge position spaced from the transfer station, mechanism moving said transfer device in timed relation with the advance of the bags to move said cup to said pick-off position for engagement with a bag at said transfer station, move the cup to said discharge position, and then return the cup to said pick-off position for engagement with the next bag, a detecting device at said detection station for feeling the sides of each bag approaching said transfer station and producing a signal in response to the presence of an underfilled bag, means normally applying vacuum to said cup when the latter is in said pick-off position and releasing the vacuum when the cup is in said discharge position thereby to release bags in the discharge position, and reject means operable in response to each of said signals, during the subsequent transfer of the underfilled bag which produced the signal, to release the vacuum applied to said cup when the latter is at an intermediate point between said pick-off and discharge positions thereby separating the underfilled bag from the remainder of the bags as an incident to the transfer from said conveyor.

2. The combination defined in claim 1 in which said reject means comprises a normally open vacuum valve operable when closed to release the vacuum applied to said cup, and means operating said valve with a delayed action in response to said signals to close the valve during the next following cycle of said transfer device whereby the transfer device completes the normal transfer of the bag preceding each underfilled bag and then picks off the underfilled bag before said valve is closed.

3. In a packaging machine, the combination of, a conveyor for supporting a succession of flexible bags in edge-to-edge relation and advancing the bags edgewise and step by step along a predetermined path successively through closing, detection and transfer stations, a sealing device at said closing station comprising opposed relatively movable sealing elements disposed on opposite sides of said path, at least one of said elements being movable toward and away from said path to clamp a portion of each bag between said elements and thereby close the bag, a pair of opposed detecting elements on opposite sides of said path at said detection station, said detecting elements being supported on said sealing elements for similar relative movement into engagement with the opposite sides of each bag in the detection station when a following bag is in said sealing station, means actuated in response to movement of said detecting elements closer together than a preselected minimum distance to produce signals indicating the presence of underfilled bags in said detection station, a transfer device for picking off each bag at said transfer station, carrying the bag away from said conveyor and normally releasing the bag at a discharge point spaced from said conveyor, and means operable in response to said signals to effect the release of underfilled bags by said transfer device between said transfer station and said discharge point thereby separating the underfilled bags from the remainder of the bags as an incident to the transfer from said conveyor.

4. The combination defined in claim 3 in which said detecting elements comprise a feeler on one side of said path and a backing on the opposite side of the path, said feeler being urged yieldably toward said backing and the latter being reciprocable toward and away from said path into and out of engagement with said bags.

5. The combination defined in claim 4 in which said feeler is the free end portion of an elongated spring arm supported at one end on one of said sealing elements and extending along said path therefrom to said detection station.

6. In a packaging machine, the combination of, a conveyor for supporting a succession of flexible bags in edge-to-edge relation and advancing the bags edgewise and step by step along a predetermined path through detection and transfer stations, a transfer device at said transfer station engageable with each bag in the transfer station and movably away from the latter to a discharge position, means normally operating said transfer device to grip each successive bag at said transfer station, carry the bag to said discharge position, and release the bag, a detecting device at said detection station comprising two detecting elements disposed on opposite sides of said path and movable toward and away from each other, mechanism for moving said elements toward each other and into engagement with the opposite sides of each bag passing through said detection station whereby said elements are spaced apart a distance corresponding to the thickness of the bag between them, means actuated in response to movement of said elements closer together than a preselected minimum distance to produce a signal indicating the presence of an underfilled bag, and means operable in response to such signals to effect the release of each underfilled bag by said transfer device between said transfer station and said discharge position thereby separating the underfilled bags from the remainder of the bags as an incident to the transfer from said conveyor.

7. In a packaging machine, the combination of, a conveyor for supporting a succession of flexible bags in edge-to-edge relation and advancing the same edgewise along a predetermined path to a transfer station, a transfer device at said transfer station including a gripper movable back and forth between a pick-off position in engagement with the bag in said transfer station and a discharge position at a point spaced from said station, means normally operating said gripper in timed relation with the advance of the bags to pick off each successive bag at said transfer station, carry the bag to said discharge position and release the bag, a detecting device along said path for feeling the sides of each bag and producing a signal in response to the passing of an underfilled bag, and means operable in response to such signals to effect the subsequent release of each underfilled bag by said gripper at an intermediate point between said pick-off and discharge positions thereby separating the underfilled bags from the remainder of the bags as an incident to the transfer from said conveyor.

8. In a packaging machine, the combination of, means for supporting a succession of flexible packages and advancing the same along a predetermined path to a transfer station, a transfer device at said transfer station engageable with each package at the transfer station and movable away from the latter to a discharge position, means normally operating said transfer device to grip each successive package at said transfer station, transfer the package to said discharge position and release the package at the discharge position, a detecting device along said path for feeling the sides of each package and producing a signal in response to the passing of an improperly filled package, and means operable in response to such signals to effect the subsequent release and rejection of each improperly filled package by said transfer device at an intermediate point between said transfer station and said discharge position thereby separating the improperly filled packages from the remainder of the packages as an incident to the transfer of the bags from said supporting means.

References Cited

UNITED STATES PATENTS

| | | | |
|---|---|---|---|
| 2,826,881 | 3/1958 | Ki Negoro | 53—63 |
| 2,996,855 | 8/1961 | Bergeron | 53—53 |
| 3,080,659 | 3/1963 | Wolford | 209—88 X |

M. HENSON WOOD, Jr., *Primary Examiner.*

R. A. SCHACHER, *Assistant Examiner.*